US012781951B2

(12) United States Patent
Karthauser et al.

(10) Patent No.: US 12,781,951 B2
(45) Date of Patent: Nov. 3, 2026

(54) ILLUMINATION SYSTEM FOR TRAFFIC SIGNS

(71) Applicant: Traffic and Parking Control Co., LLC, Brown Deer, WI (US)

(72) Inventors: Zachary Karthauser, Brookfield, WI (US); Adrian Teekasingh, Milwaukee, WI (US)

(73) Assignee: Traffic and Parking Control Co., LLC, Brown Deer, WI (US)

( * ) Notice: Subject to any disclaimer, the term of this patent is extended or adjusted under 35 U.S.C. 154(b) by 0 days.

(21) Appl. No.: 19/252,693

(22) Filed: Jun. 27, 2025

(65) Prior Publication Data

US 2026/0002660 A1 Jan. 1, 2026

Related U.S. Application Data

(60) Provisional application No. 63/665,098, filed on Jun. 27, 2024.

(51) Int. Cl.
*F21V 11/16* (2006.01)
*F21V 5/04* (2006.01)
(Continued)

(52) U.S. Cl.
CPC ............ *F21V 23/0442* (2013.01); *F21V 5/04* (2013.01); *F21V 11/16* (2013.01); *F21W 2131/103* (2013.01); *F21Y 2115/10* (2016.08)

(58) Field of Classification Search
CPC ........ F21V 23/0442; F21V 5/04; F21V 11/16; F21V 23/0464; F21V 23/0471;
(Continued)

(56) References Cited

U.S. PATENT DOCUMENTS 3,903,409 A * 9/1975 Richilano ............... F21S 8/086 362/396
8,331,037 B2 * 12/2012 Lu ........................... F21V 5/007 359/741
(Continued)

FOREIGN PATENT DOCUMENTS

KR 20100091771 A * 8/2010 ........... H05B 47/105
WO WO-2023217913 A2 * 11/2023 ................ F21V 5/04

OTHER PUBLICATIONS

English translation of KR 20100091771 A (Year: 2010).*
(Continued)

*Primary Examiner* — Omar Rojas Cadima
(74) *Attorney, Agent, or Firm* — Godfrey & Kahn, S.C.; Shane Delsman; William B. Fox

(57) ABSTRACT

The present disclosure provides an illumination system comprising a housing, a connection assembly configured to connect the housing to a support structure such as a traffic sign pole, a lighting element associated with the housing, and a controller configured to control operation of the lighting element. The housing includes a portion defining a cavity that surrounds at least a portion of the lighting element. The lighting element includes an optical element, such as a lens with a specific cone angle, configured to direct light from the lighting element to selectively illuminate a target area of a roadway, such as pavement markings, without illuminating other portions of the roadway. The controller may be configured to control the lighting element based on various inputs including pre-programmed schedules, ambient conditions, or signals from sensors or user input devices.

20 Claims, 9 Drawing Sheets

(51) Int. Cl.

| | |
|---|---|
| ***F21V 23/04*** | (2006.01) |
| *F21W 131/103* | (2006.01) |
| *F21Y 115/10* | (2016.01) |

(58) Field of Classification Search

CPC ............. F21V 23/0478; F21V 23/0492; F21V 21/008; F21W 2131/103; F21Y 2115/10; B60Q 2400/40; B60Q 2400/50; G08G 1/005; G08G 1/01; G08G 1/0104; G08G 1/00; H05B 47/1985; H05B 47/115; H05B 47/12; H05B 47/125; H05B 47/13; F21S 8/085; F21S 8/086; F21S 8/088

See application file for complete search history.

(56) References Cited

U.S. PATENT DOCUMENTS

| | | | | |
|---|---|---|---|---|
| 2010/0320933 A1* | 12/2010 | Lai .......................... | F21V 5/002 315/294 |
| 2022/0005346 A1* | 1/2022 | Rampersad .......... | H05B 47/115 |
| 2023/0121234 A1* | 4/2023 | Camras .................... | B60Q 1/24 340/944 |

OTHER PUBLICATIONS

Website screenshot for J.W. Speaker LED Warning and Safety Light—Model 529 4"×19" LED Warning & Safety light, https://web.archive.org/web/20240914163241/https:/www.jwspeaker.com/products/model-529-led-warning-light-and-indicator-light/ publicly available on Sep. 14, 2024.

Website screenshot for J.W. Speaker LED Safety Light—Model 560 Warning Projector Light 4.5"×6" LED Safety & Warning Light, https://web.archive.org/web/20250429142620/https:/www.jwspeaker.com/products/model-560-emergency-warning-projection-light/ publicly available on Apr. 29, 2025.

Website screenshot for J.W. Speaker LED Safety Lights—Model 793 6"×2" LED Warning Light, https://web.archive.org/web/20240223025701/https:/www.jwspeaker.com/products/led-safety-lights-model-793/ publicly available on Feb. 23, 2024.

Website screenshot for Lanelight, https://web.archive.org/web/20250619161325/https:/lanelight.com/ publicly available on Jun. 19, 2025.

Website screenshot for Traffic Safety Corp. RRFBs & Flashing Beacons, https://web.archive.org/web/20240926162916/https://xwalk.com/rrfb-flashing-beacons/ publicly available on Sep. 26, 2024.

Website screenshot for Fhoss Halo Exclusion Zone, https://web.archive.org/web/20241107072655/https://www.fhoss.com/system/fhoss-halo-exclusion-zone/ publicly available on Nov. 7, 2024.

* cited by examiner

ILLUMINATION SYSTEM FOR TRAFFIC SIGNS

CROSS REFERENCE TO RELATED APPLICATIONS

This application claims priority to U.S. Application No. 63/665,098, titled "LIGHTING FIXTURE FOR USE WITH A TRAFFIC SIGN," filed Jun. 27, 2024, which is hereby incorporated by reference in its entirety.

BACKGROUND

Traffic signs and markings play a crucial role in guiding and alerting drivers on roadways. However, their effectiveness can be diminished during low-light conditions or inclement weather. Illumination systems have been developed to enhance the visibility of traffic signs and pavement markings in various conditions. These systems typically involve lighting fixtures that can be mounted on or near existing traffic infrastructure.

Advancements in lighting technology, such as the development of efficient LED light sources, have enabled new possibilities for illuminating roadway features. Additionally, improvements in power management and control systems allow for more sophisticated operation of illumination devices. As transportation infrastructure continues to evolve, there remains an ongoing interest in enhancing the visibility and effectiveness of traffic control devices through improved illumination techniques.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
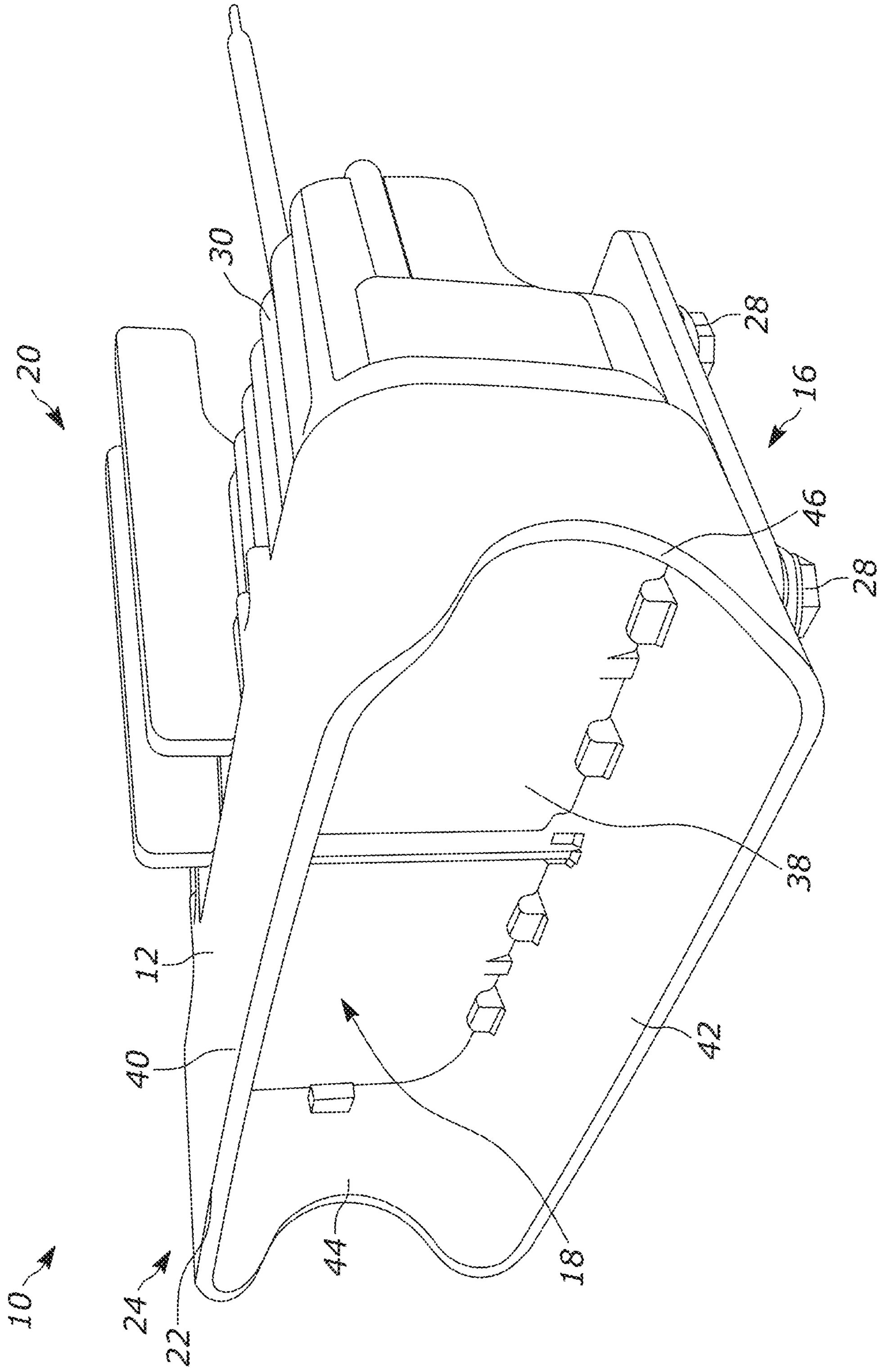
FIG. 1 is a perspective view of an illumination system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Existing illumination systems for traffic signs and pavement markings often fail to provide adequate visibility in low-light conditions or inclement weather. Many systems illuminate large areas of the roadway indiscriminately, potentially causing glare or distraction for drivers. Additionally, current solutions may lack flexibility in adjusting illumination patterns based on specific traffic scenarios or environmental conditions. The power consumption of some illumination systems can be excessive, limiting their applicability in areas without reliable access to electricity.

Conventional illumination methods may not effectively highlight critical areas such as crosswalks, stop lines, or railroad crossings, potentially compromising pedestrian and driver safety. Some existing systems are difficult to install or retrofit onto existing traffic infrastructure, requiring extensive modifications or replacements of sign poles and other structures. Furthermore, many current illumination solutions lack intelligent control systems that can adapt to changing conditions or integrate with other traffic management systems.

Thus, there exists a need for an improved technical method, device, and system for a selective roadway illumination system that enhances visibility of critical pavement markings and traffic signs while minimizing light pollution and energy consumption.

In accordance with one example embodiment, an illumination system includes a housing, a connection assembly configured to connect the housing to a support structure, a lighting element associated with the housing, and a controller configured to control operation of the lighting element. The housing includes a portion defining a cavity. The lighting element includes an optical element configured to direct light from the lighting element to selectively illuminate a target area of a roadway.

In accordance with another example embodiment, the housing comprises a shroud defining a cavity surrounding at least a portion of the lighting element.

In accordance with another example embodiment, the shroud includes a rear wall on a distal end of the housing, an overhang portion on a proximal end of the housing, and a bottom wall coupling the rear wall and the overhang portion.

In accordance with another example embodiment, the optical element comprises a lens.

In accordance with another example embodiment, the lens has a cone angle configured to direct light from the lighting element to selectively illuminate the target area without illuminating other portions of the roadway.

In accordance with another example embodiment, the cone angle of the lens is between 30 and 45 degrees.

In accordance with another example embodiment, the lighting element comprises one or more light-emitting diodes (LEDs).

In accordance with another example embodiment, the illumination system further includes an electronic controller coupled to the lighting element, wherein the electronic controller is configured to control the lighting element to illuminate the target area.

In accordance with another example embodiment, the electronic controller is configured to control the lighting element to illuminate the target area based on a pre-programmed schedule.

In accordance with another example embodiment, the controller is configured to control the lighting element to illuminate the target area continuously or in a blinking pattern.

In accordance with another example embodiment, the controller is configured to control the lighting element to illuminate the target area in a blinking pattern.

In accordance with another example embodiment, the electronic controller is configured to control the lighting element to illuminate the target area based on ambient conditions.

In accordance with another example embodiment, the ambient conditions include at least one selected from a group consisting of a light level, a relative humidity, a sound level, and a weather condition.

In accordance with another example embodiment, the illumination system further includes one or more sensors configured to detect vulnerable road users proximate to the illumination system, wherein the electronic controller is further configured to control the lighting element to illuminate the target area based on signals received from the one or more sensors.

In accordance with another example embodiment, the electronic controller is configured to control the lighting element based on signals received from a user input device.

In accordance with another example embodiment, the user input interface device comprises a crosswalk request button.

In accordance with another example embodiment, the lighting element configured to emit light of a color matching a color of a traffic sign and/or a pavement marking.

In accordance with another example embodiment, the support structure is a traffic sign pole.

In accordance with another example embodiment, the target area comprises a pavement marking on the roadway.

In accordance with another example embodiment, a method of illuminating a pavement marking includes connecting an illumination system to a traffic sign pole, the illumination system including a shroud housing a lighting element, positioning the illumination system such that a lens of the lighting element is oriented towards a roadway, and activating the lighting element to selectively illuminate a target area on the roadway. The lens has a cone angle configured to direct light from the lighting element to the target area without illuminating other portions of the roadway.

Each of the above-mentioned embodiments will be discussed in more detail below, starting with example system and device architectures of the system in which the embodiments may be practiced, followed by an illustration of processing blocks for achieving an improved technical method, device, and system for an illumination system for traffic signs.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

The illumination system 10, as illustrated in FIG. 1, comprises a housing in the form of a shroud 12, a connection assembly 16, and a lighting element 18. The shroud 12 forms the outer structure of the illumination system 10, enclosing and protecting the internal components. The shroud 12 includes a portion defining a cavity 38 that surrounds at least a portion of the lighting element 18.

The shroud 12 may be constructed from various materials. In some cases, the shroud 12 may be formed of aluminum. The shroud material may have a color matching or complementary to a sign. In other cases, the shroud material may be clear, transparent, or translucent.

The shroud 12 may be constructed using various manufacturing techniques and processes. In some aspects, the shroud 12 may be formed through injection molding, where molten material is injected into a mold cavity to create the desired shape. The shroud 12 may alternatively be manufactured through extrusion processes, where material is forced through a die to form the housing structure.

In some cases, the shroud 12 may be fabricated using machining techniques, such as CNC milling or turning, to achieve precise dimensions and surface finishes. The shroud 12 may also be formed through casting processes, where liquid material is poured into a mold and allowed to solidify.

Sheet metal forming techniques may be employed, including stamping, bending, or deep drawing operations to shape the shroud 12 from flat metal stock.

The shroud 12 may be constructed through additive manufacturing processes, such as 3D printing, which allows for complex geometries and customized designs. In some aspects, the shroud 12 may be assembled from multiple components that are joined together through welding, brazing, adhesive bonding, or mechanical fastening methods.

For polymer-based shrouds 12, thermoforming processes may be utilized, where heated plastic sheets are formed over a mold using vacuum or pressure. The shroud 12 may also be constructed through rotational molding, where powdered material is heated and rotated in a mold to create hollow structures.

In some cases, the shroud 12 may incorporate reinforcement elements, such as ribs, gussets, or internal frameworks, to enhance structural integrity. The shroud 12 may include integrated mounting features, such as threaded inserts, mounting bosses, or attachment points, that are formed during the manufacturing process rather than added as separate components.

The shroud 12 includes a rear wall 30 on a distal end 20 of the housing, an overhang portion 22 on a proximal end 24 of the housing, and a bottom wall coupling the rear wall 30 and the overhang portion 22. The overhang portion 22 includes a top lip 40 and a bottom lip 42. The shroud 12 also features a first indent portion 44 and a second indent portion 46.

The connection assembly 16 is configured to connect the housing to a support structure. In some cases, the connection assembly 16 includes a recess for receiving a pole of a sign. The shroud 12 may be sized to receive a sign pole (e.g., a traffic sign pole) having a diameter between about 2 inches and about 5 inches.

The connection assembly 16 may include one or more bolts 28 for securing the illumination system 10 to the support structure.

The lighting element 18 is associated with the housing and positioned within the cavity 38 defined by the shroud 12. The lighting element 18 may be configured to provide illumination through an opening in the shroud 12.

In some cases, the illumination system 10 may include a controller configured to control operation of the lighting element 18. The controller may be housed within the cavity 38 of the shroud 12 and may be electrically connected to the lighting element 18.

The arrangement of the shroud 12, connection assembly 16, and lighting element 18 allows the illumination system 10 to be securely mounted to a support structure while providing directed illumination. The shroud 12 protects the internal components while allowing light from the lighting element 18 to be emitted in a controlled manner.

Figure 2:
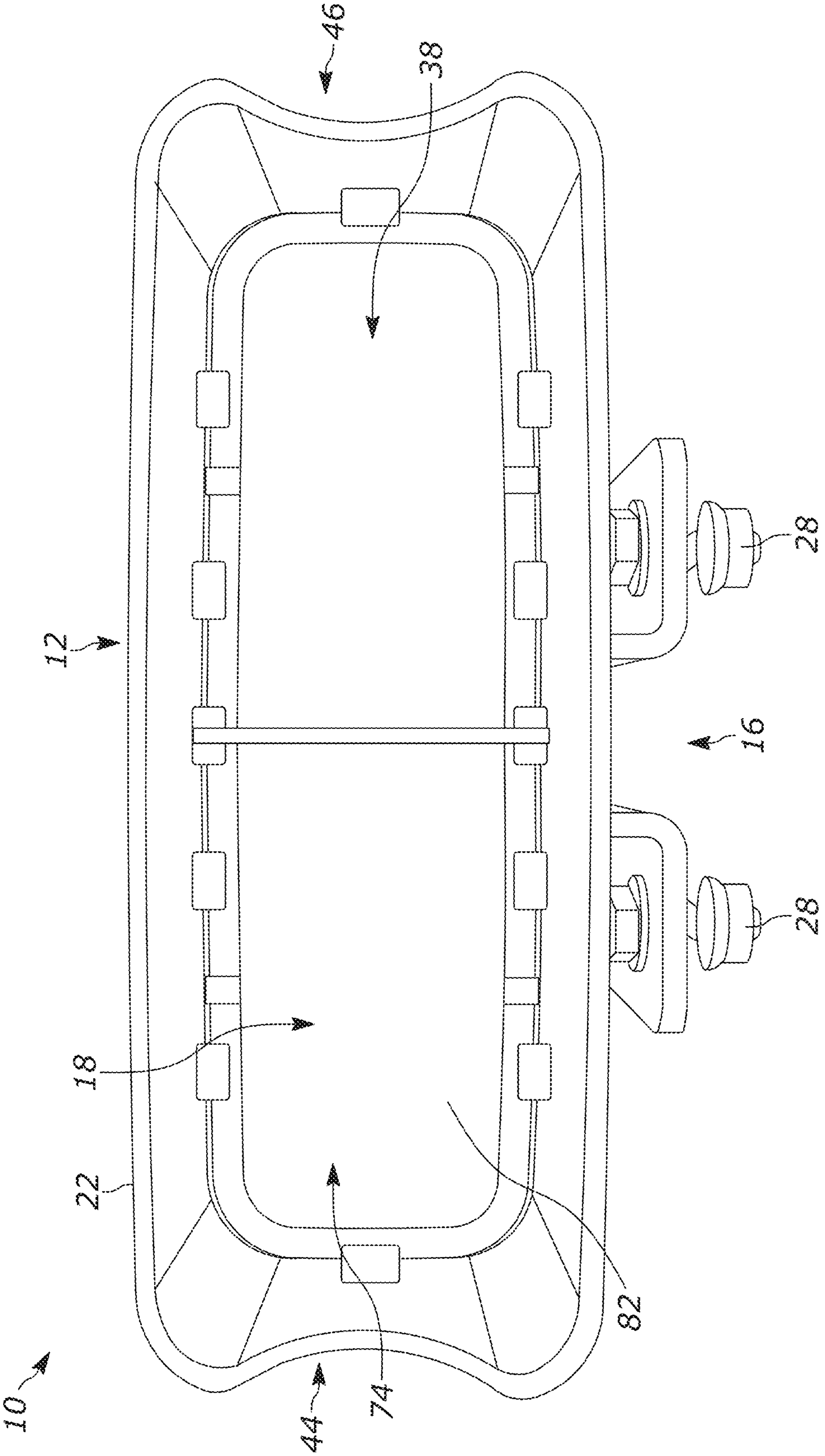
FIG. 2 is a front plan view of the illumination system, according to some examples.

FIG. 2 illustrates a front plan view of the illumination system 10. The illumination system 10 includes the shroud 12 that houses the lighting element 18. The shroud 12 incorporates the overhang portion 22 and defines the cavity 38 within its structure.

The shroud 12 includes the first indent portion 44 and the second indent portion 46 integrated into its form. These indent portions are positioned on opposite sides of the shroud 12. A bolt 28 is provided as part of the connection assembly 16, which enables mounting of the illumination system 10.

Within the cavity 38, the lighting element 18 includes a light member 74. In some cases, the light member 74 may comprise one or more light-emitting diodes (LEDs). The lighting element 18 may be configured to output light at a minimum of 20 Lux to ensure visibility of the target area.

A lens 82 is positioned over the cavity 38, working in conjunction with the lighting element 18 to direct illumination through the opening of the shroud 12. The lens 82 may be arranged to control and focus the light emission from the illumination system 10. In some cases, the lens 82 may be formed of polycarbonate.

The lens 82 may have a cone angle configured to direct light from the lighting element 18 to selectively illuminate a target area of a roadway without illuminating other portions of the roadway. In some cases, the cone angle of the lens 82 may be between 30 and 45 degrees.

The arrangement of these components within the shroud 12 creates an integrated assembly where the lighting element 18 and light member 74 are protected while allowing directed illumination through the lens 82. The overhang portion 22 extends from the main body of the shroud 12, providing coverage over the area below.

Figure 3:
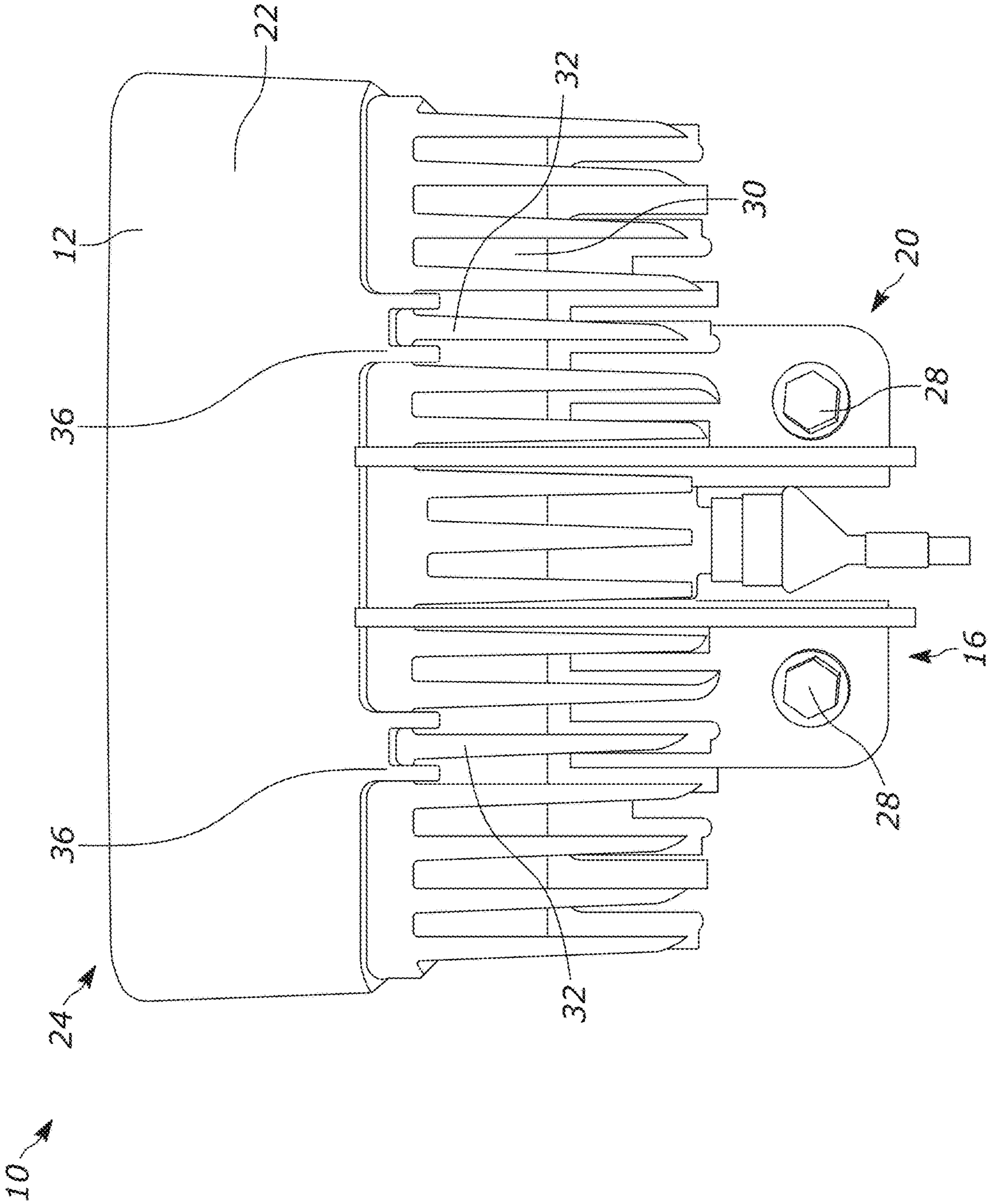
FIG. 3 is a top plan view of the illumination system, according to some examples.

FIG. 3 illustrates a top plan view of the illumination system 10. The illumination system 10 includes the shroud 12 with the overhang portion 22 at the proximal end 24. The shroud 12 extends to the distal end 20 where the rear wall 30 is positioned. The rear wall 30 may have a substantially cylindrical configuration.

In some cases, the rear wall 30 may include a plurality of protrusions 32 arranged along its surface. A coupling portion 36 may be incorporated into the illumination system 10. In some cases, a portion of the protrusions 32 may be received by the coupling portion 36 included in the overhang portion 22. This arrangement may provide structural support and facilitate assembly of the illumination system 10.

The connection assembly 16 may be visible in the bottom portion of the illumination system 10. In some cases, the connection assembly 16 may include the bolt 28 for mounting purposes. The bolt 28 may allow for secure attachment of the illumination system 10 to a support structure.

The view from above shows how the various components may be arranged. The protrusions 32 may be distributed along the rear wall 30, potentially providing additional structural integrity or serving as alignment features. The overhang portion 22 may extend outward from the main body of the shroud 12, which may provide coverage over the area below.

In some cases, the arrangement of these components may allow the illumination system 10 to be mounted and positioned while maintaining proper light direction. The coupling between the protrusions 32 and the coupling portion 36 may contribute to the overall stability and alignment of the illumination system 10 when assembled.

Figure 4:
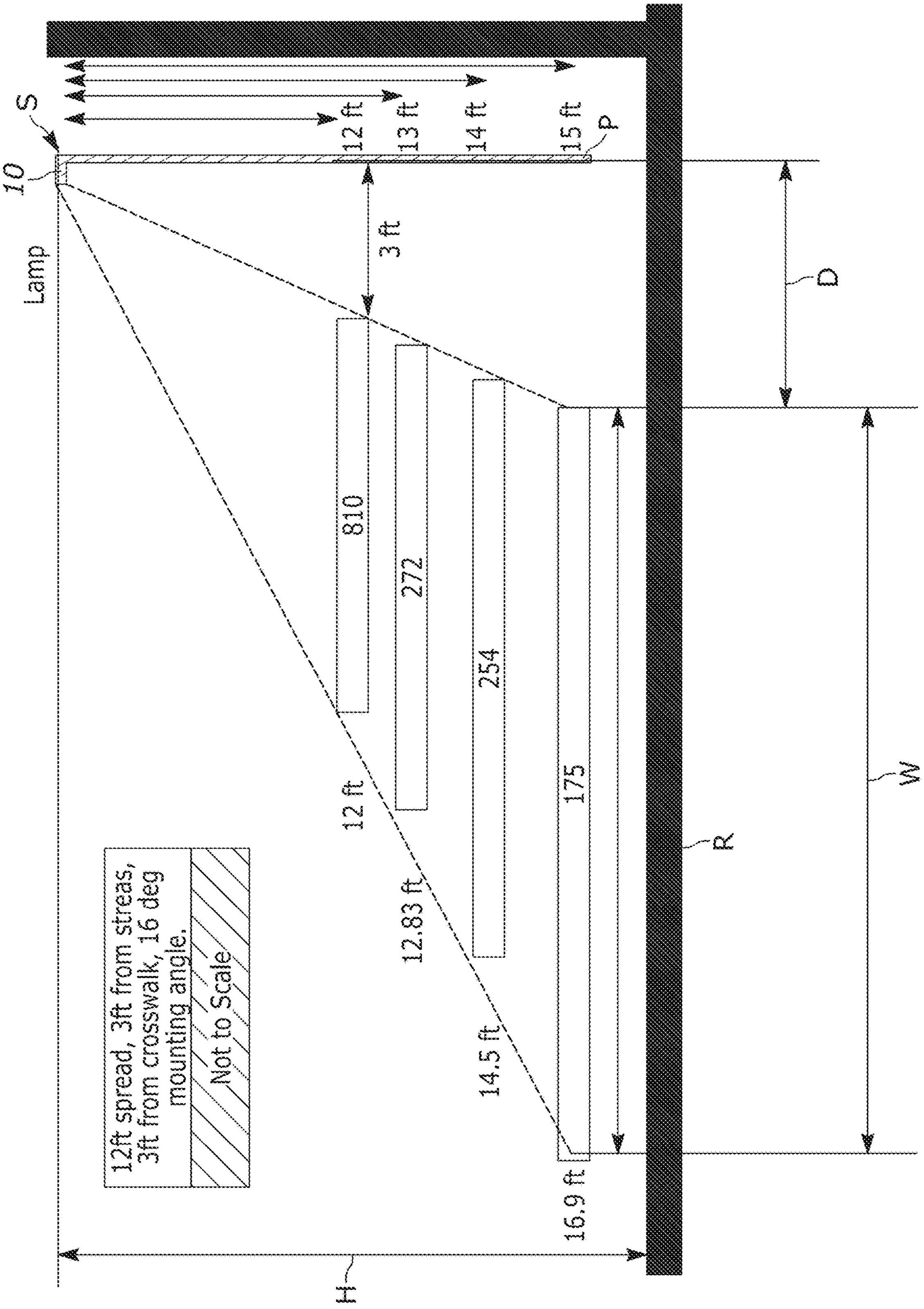
FIG. 4 is a side view diagram illustrating an illumination pattern and mounting configuration of the illumination system, according to some examples.

FIG. 4 illustrates the illumination pattern and mounting configuration of the illumination system 10. The illumination system 10 may be mounted on a pole P supporting a sign S. The pole P may be positioned adjacent to a roadway R.

The illumination system 10 may be configured with various mounting parameters that affect its performance. These parameters include a mounting height H, a mounting distance D, and an illumination width W.

The mounting height H may be defined as the vertical distance from the ground to the illumination system 10. In some cases, the mounting height H may be between 12 feet and 15 feet. The mounting distance D may be defined as the horizontal distance between the illumination system 10 and the start of the target area on the roadway R. In some cases, the mounting distance D may be between 3 feet and 6 feet.

The illumination width W may be defined as the width of the area on the roadway R that is illuminated by the lighting element 18.

FIG. 4 displays various configurations of the illumination system 10 with different mounting heights H, mounting distances D, and resulting illumination widths W. For example, when the mounting height H is 12 feet and the mounting distance D is 3 feet, the illumination width W may be approximately 12 feet. In another configuration, when the mounting height H is 15 feet and the mounting distance D is 6 feet, the illumination width W may be approximately 16.9 feet.

The lens 82 of the lighting element 18 may have a cone angle that affects the illumination pattern. This cone angle may contribute to the relationship between the mounting height H, mounting distance D, and illumination width W.

In some cases, the connection assembly 16 may allow for adjustment of the mounting angle of the illumination system 10. For example, in the illustrated example, the mounting angle is 36 degrees. This adjustment capability may provide flexibility in achieving the desired illumination pattern for various roadway configurations and sign placements.

The illumination system 10 may be configured to selectively illuminate a target area on the roadway R, such as pavement markings, without illuminating other portions of the roadway R. The combination of the mounting height H, mounting distance D, and the cone angle of the lens 82 may allow for precise control of the illumination pattern.

The shroud 12, including the overhang portion 22, may help to direct the light from the lighting element 18 towards the target area on the roadway R. The first indent portion 44 and the second indent portion 46 may also contribute to shaping the illumination pattern.

Figure 5A:
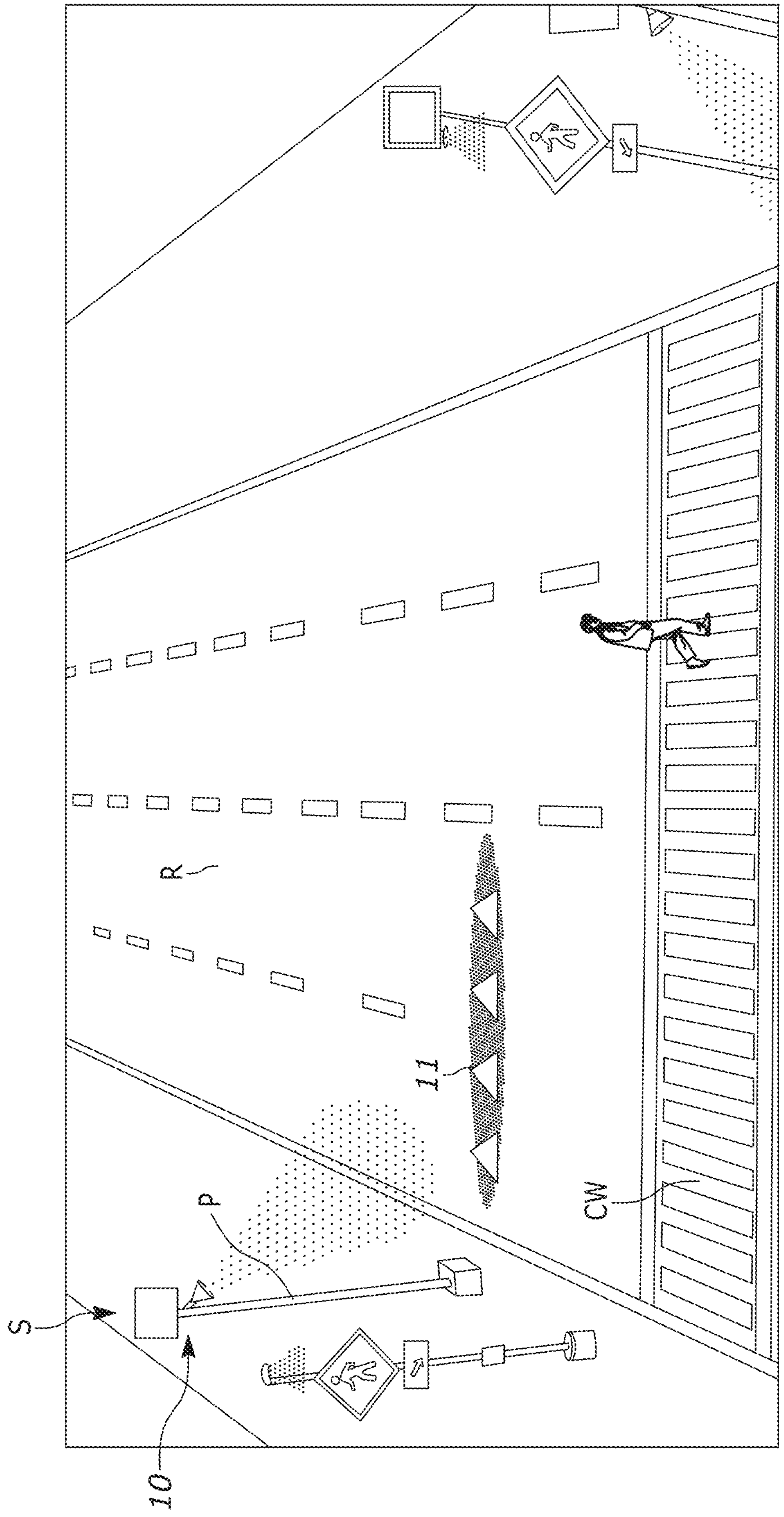
FIG. 5A is a top-down view of a roadway scene with the illumination system illuminating pavement markings, according to some examples.

FIG. 5A illustrates an application of the illumination system 10 in a crosswalk scenario. The illumination system 10 may be mounted on a pole P supporting a sign S adjacent to a roadway R. In some cases, the sign S may be a pedestrian crossing sign.

The illumination system 10 may be connected to the pole P using the connection assembly 16. The connection assembly 16 may allow for secure attachment of the illumination system 10 to the pole P without modifying the pole P.

In some cases, the illumination system 10 may be positioned such that the lens 82 of the lighting element 18 is oriented towards the roadway R. This orientation may allow the lighting element 18 to selectively illuminate a target area on the roadway R.

The target area may comprise pavement markings 11 on the roadway R. The pavement markings 11 may be positioned before a crosswalk CW. The illumination system 10 may be configured to selectively illuminate the pavement markings 11 without illuminating other portions of the roadway R.

The mounting height and mounting distance of the illumination system 10 may be adjusted to achieve the desired illumination pattern. In some cases, the mounting height may be between 12 feet and 15 feet, and the mounting distance may be between 3 feet and 6 feet.

The shroud 12 of the illumination system 10, including the overhang portion 22, may help to direct the light from the lighting element 18 towards the pavement markings 11. The first indent portion 44 and the second indent portion 46 may also contribute to shaping the illumination pattern.

The lens 82 of the lighting element 18 may have a cone angle that affects the illumination pattern. This cone angle may contribute to the relationship between the mounting height, mounting distance, and illumination width.

In some cases, the lighting element 18 may be activated to selectively illuminate the pavement markings 11. The selective illumination may enhance the visibility of the pavement markings 11 during low-light conditions, such as at night.

The illumination of the pavement markings 11 may provide enhanced visibility for pedestrians using the crosswalk CW. By highlighting the pavement markings 11, the illumination system 10 may alert drivers to the presence of the crosswalk CW and potential pedestrian activity.

The application of the illumination system 10 in this crosswalk scenario demonstrates how the system may be used to improve safety and visibility in pedestrian crossing areas. The selective illumination of pavement markings 11 may provide a visual cue to both drivers and pedestrians, potentially enhancing awareness and safety in the crosswalk area.

Figure 5B:
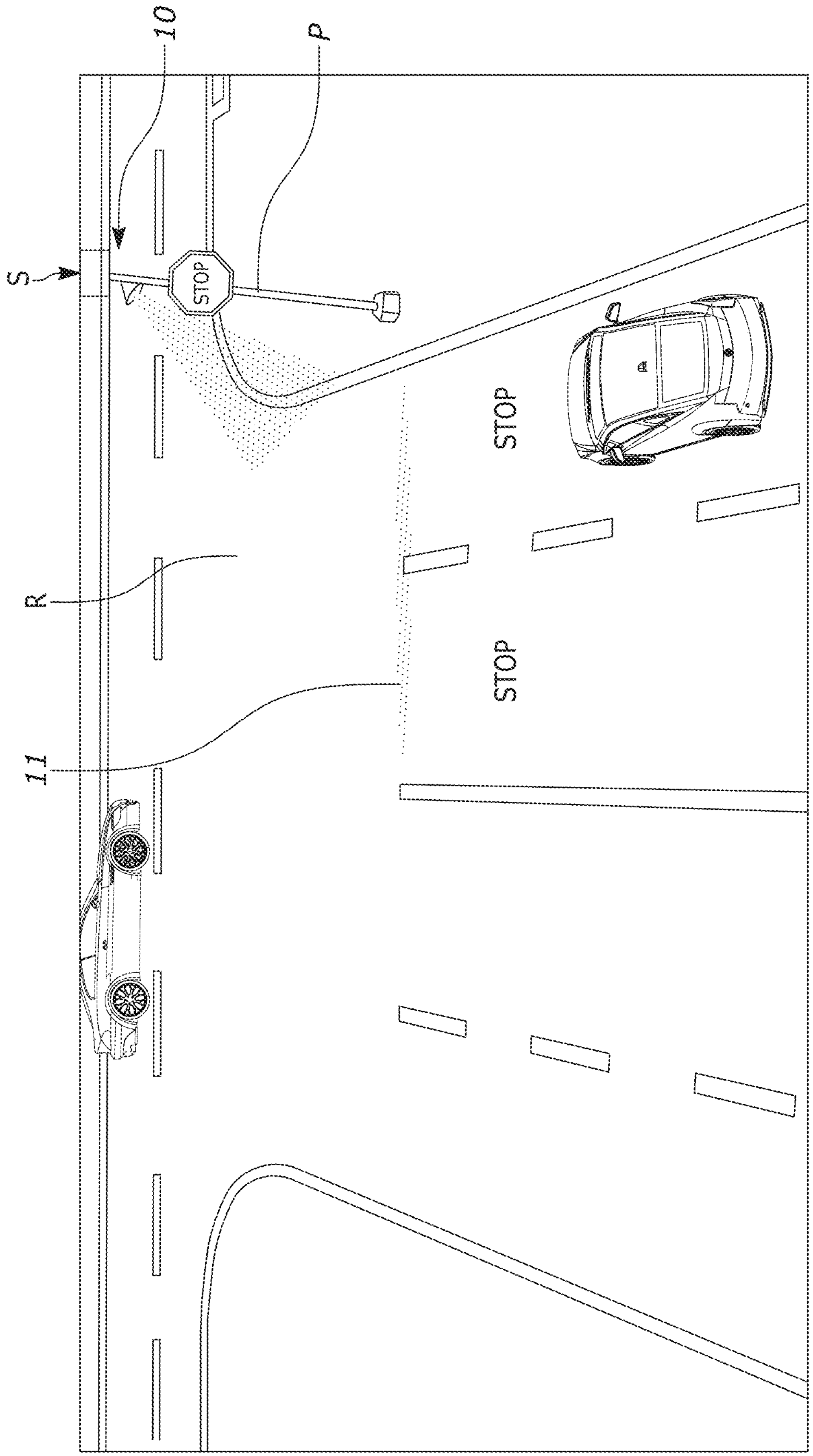
FIG. 5B is a top-down orthogonal view of an intersection with the illumination system illuminating pavement markings, according to some examples.

FIG. 5B illustrates an application of the illumination system 10 at a stop sign scenario. The illumination system 10 may be mounted on a pole P supporting a sign S adjacent to a roadway R. In some cases, the sign S may be a stop sign.

The illumination system 10 may be connected to the pole P using the connection assembly 16. The connection assembly 16 may allow for secure attachment of the illumination system 10 to the pole P without modifying the pole P. In some cases, the pole P may be a traffic sign pole.

The illumination system 10 may be positioned such that the lens 82 of the lighting element 18 is oriented towards the roadway R. This orientation may allow the lighting element 18 to selectively illuminate a target area on the roadway R.

The target area may comprise pavement markings 11 on the roadway R. The pavement markings 11 may be positioned near the stop sign S. The illumination system 10 may be configured to selectively illuminate the pavement markings 11 without illuminating other portions of the roadway R.

The mounting height and mounting distance of the illumination system 10 may be adjusted to achieve the desired illumination pattern. The shroud 12 of the illumination system 10, including the overhang portion 22, may help to direct the light from the lighting element 18 towards the pavement markings 11. The first indent portion 44 and the second indent portion 46 may also contribute to shaping the illumination pattern.

The lens 82 of the lighting element 18 may have a cone angle that affects the illumination pattern. This cone angle may contribute to the relationship between the mounting height, mounting distance, and illumination width.

In some cases, the lighting element 18 may be activated to selectively illuminate the pavement markings 11. The selective illumination may enhance the visibility of the pavement markings 11 during low-light conditions, such as at night.

The illumination of the pavement markings 11 may provide enhanced visibility for drivers approaching the intersection. By highlighting the pavement markings 11, the illumination system 10 may alert drivers to the presence of the stop sign S and the need to stop at the intersection.

The application of the illumination system 10 in this stop sign scenario demonstrates how the system may be used to improve safety and visibility at intersections. The selective illumination of pavement markings 11 may provide a visual cue to drivers, potentially enhancing awareness and safety in the intersection area.

Figure 5C:
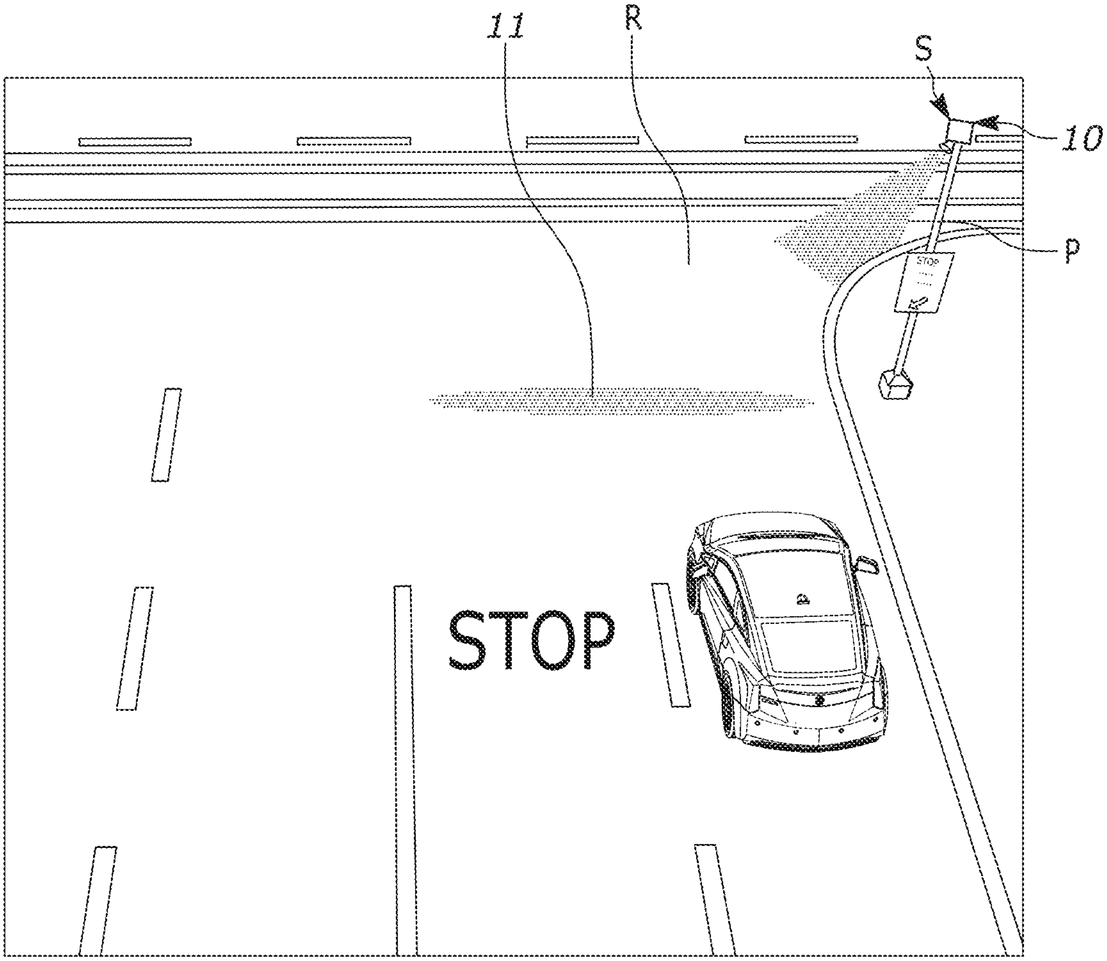
FIG. 5C is a top-down view of a roadway with the illumination system illuminating pavement markings near a vehicle, according to some examples.

FIG. 5C illustrates an application of the illumination system 10 at a railroad crossing scenario. The illumination system 10 may be mounted on the pole P supporting the sign S adjacent to the roadway R. In some cases, the sign S may be a railroad crossing sign.

The illumination system 10 may be connected to the pole P using the connection assembly 16. The connection assembly 16 may allow for secure attachment of the illumination system 10 to the pole P without modifying the pole P.

In some cases, the illumination system 10 may be positioned such that the lens 82 of the lighting element 18 is oriented towards the roadway R. This orientation may allow the lighting element 18 to selectively illuminate a target area on the roadway R.

The target area may comprise the pavement markings 11 on the roadway R. The pavement markings 11 may be positioned near the railroad crossing sign S. The illumination system 10 may be configured to selectively illuminate the pavement markings 11 without illuminating other portions of the roadway R.

The mounting height and mounting distance of the illumination system 10 may be adjusted to achieve the desired illumination pattern. The shroud 12 of the illumination system 10, including the overhang portion 22, may help to direct the light from the lighting element 18 towards the pavement markings 11. The first indent portion 44 and the second indent portion 46 may also contribute to shaping the illumination pattern.

The lens 82 of the lighting element 18 may have a cone angle that affects the illumination pattern. This cone angle may contribute to the relationship between the mounting height, mounting distance, and illumination width.

In some cases, the lighting element 18 may be activated to selectively illuminate the pavement markings 11. The selective illumination may enhance the visibility of the pavement markings 11 during low-light conditions, such as at night.

The illumination of the pavement markings 11 may provide enhanced visibility for drivers approaching the railroad crossing. By highlighting the pavement markings 11, the illumination system 10 may alert drivers to the presence of the railroad crossing sign S and the need to exercise caution when approaching the crossing.

In some cases, the lighting element 18 may be configured to emit light of a color matching a color of the railroad crossing sign S and/or the pavement markings 11. For example, if the railroad crossing sign S is yellow, the lighting element 18 may emit yellow light to match the sign color. Similarly, if the pavement markings 11 are white, the lighting element 18 may emit white light to match the color of the pavement markings 11. This color matching may enhance the visibility and recognition of the sign S and pavement markings 11, potentially improving driver awareness and safety at the railroad crossing.

The application of the illumination system 10 in this railroad crossing scenario demonstrates how the system may be used to improve safety and visibility at railroad crossings. The selective illumination of pavement markings 11 may provide a visual cue to drivers, potentially enhancing awareness and safety in the railroad crossing area.

Figure 5D:
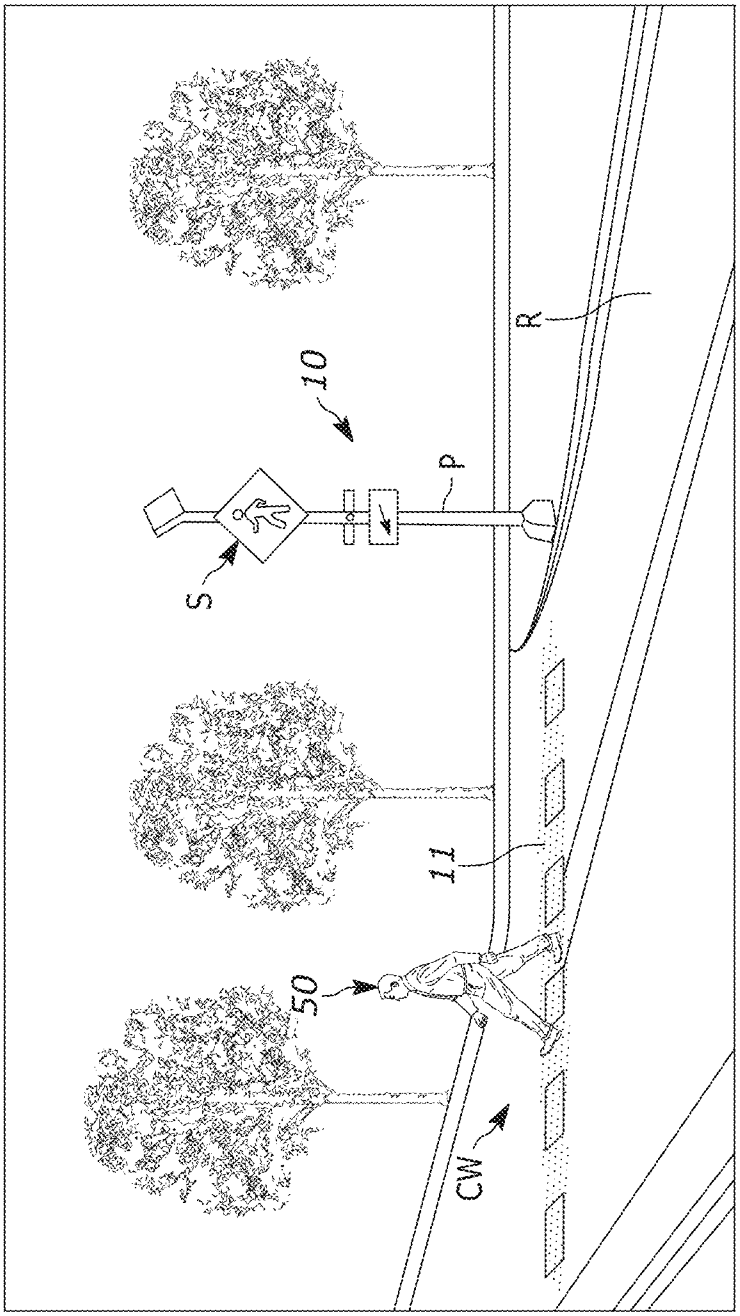
FIG. 5D is a nighttime view of the illumination system illuminating a crosswalk with a pedestrian, according to some examples.

FIG. 5D illustrates an application of the illumination system 10 at a pedestrian crossing scenario. The illumination system 10 may be mounted on the pole P supporting the sign S adjacent to the roadway R. In some cases, the sign S may be a pedestrian crossing sign.

The illumination system 10 may be connected to the pole P using the connection assembly 16. The connection assembly 16 may allow for secure attachment of the illumination system 10 to the pole P without modifying the pole P.

The illumination system 10 may be positioned such that the lens 82 of the lighting element 18 is oriented towards the roadway R. This orientation may allow the lighting element 18 to selectively illuminate a target area on the roadway R.

The target area may comprise the pavement markings 11 on the roadway R. The pavement markings 11 make up a crosswalk CW. The illumination system 10 may be configured to selectively illuminate the pavement markings 11 without illuminating other portions of the roadway R.

The mounting height and mounting distance of the illumination system 10 may be adjusted to achieve the desired illumination pattern. The shroud 12 of the illumination system 10, including the overhang portion 22, may help to direct the light from the lighting element 18 towards the pavement markings 11. The first indent portion 44 and the second indent portion 46 may also contribute to shaping the illumination pattern.

The lens 82 of the lighting element 18 may have a cone angle that affects the illumination pattern. This cone angle may contribute to the relationship between the mounting height, mounting distance, and illumination width.

In some cases, the lighting element 18 may be activated to selectively illuminate the pavement markings 11. The selective illumination may enhance the visibility of the pavement markings 11 during low-light conditions, such as at night.

The illumination of the pavement markings 11 may provide enhanced visibility for pedestrians using the crosswalk CW. In the illustrated example, pedestrian 50 is crossing the illuminated crosswalk CW. By highlighting the pavement markings 11, the illumination system 10 may alert drivers to the presence of the pedestrian crossing sign S and the need to exercise caution when approaching the crossing.

In some cases, the lighting element 18 may be configured to emit light of a color matching a color of the pedestrian crossing sign S and/or the pavement markings 11. For example, if the pedestrian crossing sign S is yellow, the lighting element 18 may emit yellow light to match the sign color. Similarly, if the pavement markings 11 are white, the lighting element 18 may emit white light to match the color of the pavement markings 11. This color matching may enhance the visibility and recognition of the sign S and pavement markings 11, potentially improving driver awareness and safety at the pedestrian crossing.

The application of the illumination system 10 in this pedestrian crossing scenario demonstrates how the system may be used to improve safety and visibility at pedestrian crossings. The selective illumination of pavement markings 11 may provide a visual cue to both drivers and pedestrians, potentially enhancing awareness and safety in the crosswalk area.

Figure 6:
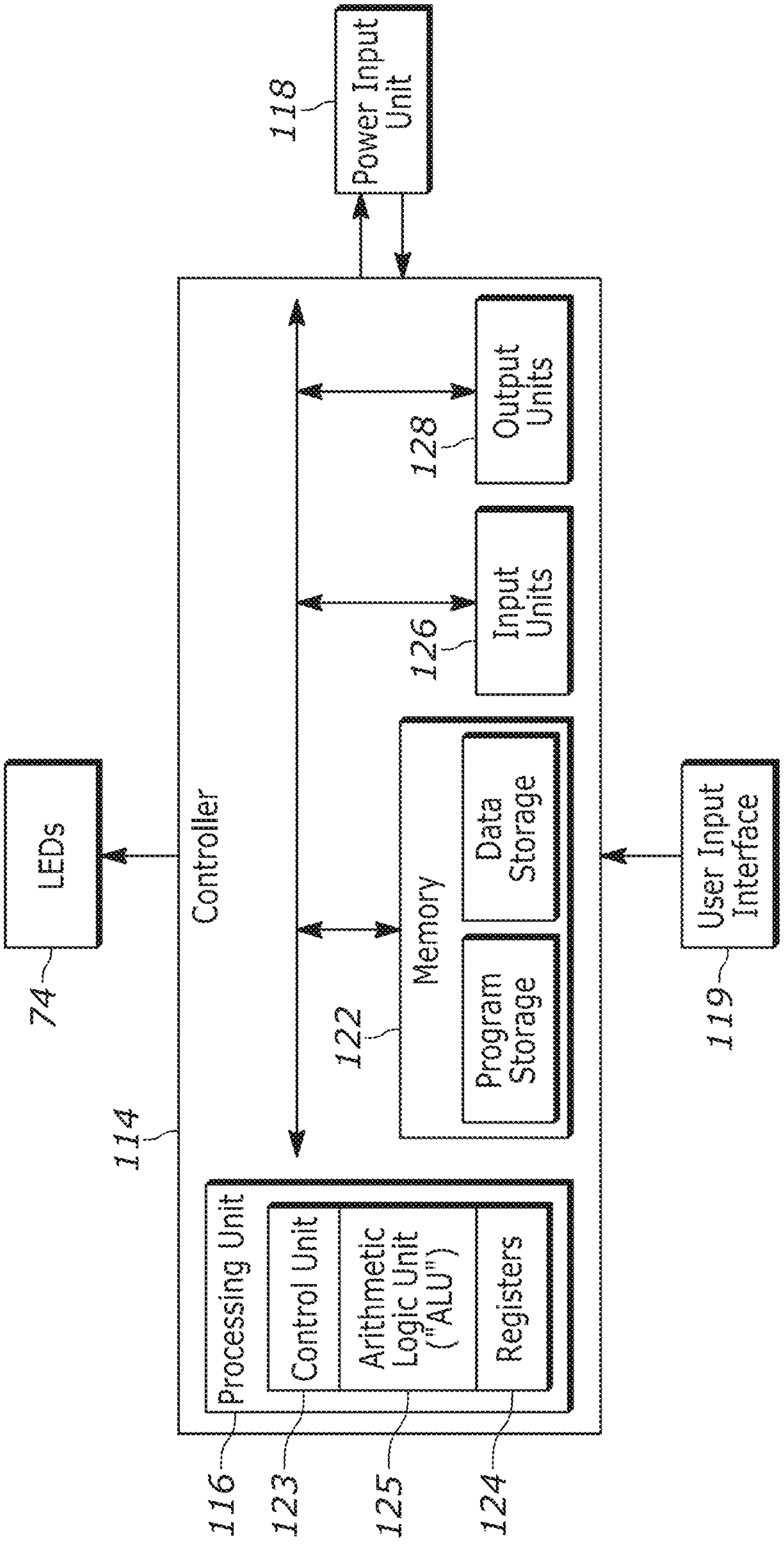
FIG. 6 is a block diagram of a control system for the illumination system, according to some examples.

FIG. 6 illustrates a block diagram of a control system for the illumination system 10. The control system includes an electronic controller 114 that serves as the central component for managing the operation of the illumination system 10.

The electronic controller 114 comprises several key components, including a processing unit 116, memory 122, and various interfaces. The processing unit 116 may include a control unit 123, an arithmetic logic unit 125, and registers 124. These components work together to execute control algorithms and process data for the illumination system 10.

The memory 122 may store program instructions and data necessary for the operation of the illumination system 10. In some cases, the memory 122 may include both program storage and data storage areas.

The electronic controller 114 may include input units 126 and output units 128 that facilitate communication with other components of the illumination system 10. The input units 126 may receive signals from various sources, such as sensors or user input devices. The output units 128 may send control signals to other components, such as the light member 74.

A user input interface 119 may be connected to the electronic controller 114, allowing users to interact with and control the illumination system 10. In some cases, the user input interface 119 may be a crosswalk request button.

The electronic controller 114 may be powered by a power input unit 118. In some cases, the power input unit 118 may include a battery to provide power to the illumination system 10. The power input unit 118 may also be configured to work with a solar powered pedestrian crosswalk warning system.

The electronic controller 114 may be configured to control the lighting element 18 based on various factors. In some cases, the electronic controller 114 may control the lighting element 18 to illuminate the target area based on a pre-programmed schedule stored in the memory 122.

The electronic controller 114 may also be configured to control the lighting element 18 based on signals received from the user input interface 119. For example, when a pedestrian presses a crosswalk request button, the electronic controller 114 may activate the lighting element 18 to illuminate the crosswalk CW.

In some cases, the electronic controller 114 may be configured to control the lighting element 18 to illuminate the target area continuously or in a blinking pattern. For example, a local transportation department might configure the system to operate continuously during nighttime hours at standard intersections, while programming a rapid blinking pattern during school zone hours. A county traffic engineering division might implement a slow pulsing pattern near railroad crossings to enhance driver attention or configure the system to increase illumination intensity during adverse weather conditions. Municipal agencies might program different flash rates based on posted speed limits, with faster blinking patterns in higher-speed zones to improve driver reaction time. The controller 114 could also be configured by local authorities to synchronize illumination with existing traffic signal timing at complex intersections or to operate with specialized patterns during emergency vehicle approaches when integrated with traffic preemption systems.

The electronic controller 114 may be further configured to control the lighting element 18 based on signals received from one or more sensors. These sensors may detect various ambient conditions, such as light level, relative humidity, sound level, or weather conditions. The electronic controller 114 may adjust the operation of the lighting element 18 based on these detected conditions.

For example, in low light conditions, the electronic controller 114 may increase the intensity of the lighting element 18 to improve visibility of the pavement markings 11. During adverse weather conditions, the electronic controller 114 may activate a specific illumination pattern to alert drivers to exercise caution.

In some cases, the electronic controller 114 may utilize relative humidity measurements to determine when atmospheric conditions may reduce visibility and warrant activation of the lighting element 18. For example, when relative humidity levels exceed approximately 85%, the electronic controller 114 may detect conditions that could indicate the presence of fog, mist, or other moisture-related visibility impairments. Under such conditions, the electronic controller 114 may automatically activate the lighting element 18 or increase its intensity to compensate for the reduced visibility of pavement markings 11.

The electronic controller 114 may be programmed with threshold values for relative humidity that correspond to different visibility conditions. In some aspects, when relative humidity reaches 90% or higher, the electronic controller 114 may initiate a more intensive illumination pattern, such as increased brightness or a pulsing sequence, to enhance the visibility of the target area during these potentially hazardous conditions. The system may also combine relative humidity data with other sensor inputs, such as ambient light levels or temperature readings, to provide a more comprehensive assessment of visibility conditions and determine the appropriate illumination response.

The electronic controller 114 may be programmed to operate the illumination system 10 in a low power consumption mode. This mode may be activated during periods of low activity or when battery power is low. In the low power consumption mode, the electronic controller 114 may reduce the frequency or intensity of illumination to conserve energy.

The components of the electronic controller 114 work together to process inputs, execute control algorithms, and generate appropriate outputs to manage the operation of the light member 74. The processing unit 116 may execute instructions stored in the memory 122 to determine the appropriate illumination parameters based on the current conditions and system settings.

For instance, when a signal is received from the user input interface 119, the processing unit 116 may retrieve the corresponding illumination pattern from the memory 122. The processing unit 116 may then use the arithmetic logic unit 125 to calculate the necessary timing and intensity values for the light member 74. These calculated values may be temporarily stored in the registers 124 before being sent to the light member 74 through the output units 128.

The electronic controller 114 provides a flexible and adaptable control system for the illumination system 10. By integrating various inputs and programmable logic, the electronic controller 114 enables the illumination system 10 to respond effectively to different scenarios and conditions, enhancing the visibility and safety of roadway features such as crosswalks and pavement markings.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An illumination system, comprising:
a housing;
a connection assembly configured to connect the housing to a support structure;
a lighting element that includes an optical element and is associated with the housing; and
a controller electrically coupled to the lighting element for selective activation of the lighting element to emit light,
wherein the housing includes a shroud that at least in part defines a cavity that surrounds at least a portion of the lighting element,
wherein the shroud includes a top lip, a bottom lip, a first indent portion, and a second indent portion, and
wherein the shroud and the optical element in combination direct light emitted from the lighting element to form an illumination pattern on a target area of a roadway.

2. The illumination system of claim 1, wherein the controller is configured to selectively activate the lighting element in response to at least one vehicle and a pedestrian in proximity to the illumination system.

3. The illumination system of claim 1, wherein the target area comprises a pavement marking on the roadway.

4. The illumination system of claim 1, wherein the optical element comprises a lens.

5. The illumination system of claim 4, wherein the lens has a cone angle and the cone angle and shroud in combination direct light emitted from the lighting element to form an illumination pattern on the target area without illuminating other portions of the roadway.

6. The illumination system of claim 5, wherein the cone angle of the lens is between 30 and 45 degrees.

7. The illumination system of claim 1, wherein the lighting element comprises one or more light-emitting diodes (LEDs).

8. The illumination system of claim 1, wherein the controller is an electronic controller coupled to the lighting element and is configured to control the lighting element to form an illumination pattern on the target area of a roadway.

9. The illumination system of claim 1, wherein the controller is configured to control the lighting element to form an illumination pattern on the target area of a roadway based on a pre-programmed schedule.

10. The illumination system of claim 1, wherein the controller is configured to control the lighting element to form an illumination pattern on the target area of a roadway based on a pre-programmed schedule.

11. The illumination system of claim 1, wherein the controller is configured to control the lighting element to illuminate the target area in a blinking pattern.

12. The illumination system of claim 1, wherein the controller is configured to control the lighting element to form an illumination pattern on the target area of a roadway based on ambient conditions.

13. The illumination system of claim 12, wherein the ambient conditions include at least one selected from a group consisting of a light level, a relative humidity, a sound level, and a weather condition.

14. The illumination system of claim 1, further comprising:
one or more sensors;
wherein the controller is further configured to control the lighting element to illuminate the target area based on signals received from the one or more sensors.

15. The illumination system of claim 1, wherein the controller is configured to control the lighting element based on signals received from a user input device.

16. The illumination system of claim 15, wherein the user input device comprises a crosswalk request button.

17. The illumination system of claim 1, wherein the lighting element is configured to emit light of a color matching a color of a traffic sign and/or a pavement marking.

18. The illumination system of claim 1, wherein the support structure is a traffic sign pole.

19. The illumination system of claim 1, wherein the top lip and bottom lip each extend a first distance from the lens, and the first indent portion and second indent portion each extend a second distance from the lens, and wherein the first distance is greater than the second distance, and the first indent portion and second indent portion are situated on opposite ends of the shroud and each extend between the top lip and bottom lip.

20. The illumination system of claim 19, wherein the first indent portion and second indent portion are parabolic in shape.

* * * * *